Patented May 31, 1949

2,471,913

UNITED STATES PATENT OFFICE 2,471,913

TREATMENT OF SOLID DILUENT IN HYDROCARBON SYNTHESIS PROCESS

Simpson D. Sumerford, Baton Rouge, La., assignor to Standard Oil Development Company, a corporation of Delaware No Drawing. Application February 27, 1947, Serial No. 731,406

3 Claims. (Cl. 260—449.6)

The present invention is concerned with an improved hydrocarbon synthesis reaction. It is more particularly concerned with a hydrocarbon synthesis process wherein a solid diluent such as sand is employed in the synthesis zone. In accordance with my invention I chemically treat the sand and eliminate the adverse effect on selectivity which otherwise results. In accordance with a preferred modification of my invention I conduct a hydrocarbon synthesis reaction using an acid treated sand as a fluidized diluent.

It is well known in the art to conduct hydrocarbon synthesis reactions by contacting hydrogen and oxides of carbon with catalysts under various temperature and pressure conditions. The catalyst employed is usuallyed selected from the iron group metals, as for example, iron, cobalt, and nickel. The catalysts are utilized either alone or are employed in conjunction with carriers such as kieselguhr, diatomaceous earth, synthetic gels, silica, and alumina. Promoters such as sodium and potassium carbonate, oxides of chromium, zinc, aluminum, magnesium, and alkali metals are used with the iron group metals. These catalysts are employed in either fixed bed or fluid catalyst operations.

The temperatures employed in the synthesis reaction zone vary widely, as for example in the range from about 300° F. to about 800° F., and are generally in the range from about 350° F. to about 725° F. The pressures, likewise, vary considerably and are a function of other operating conditions such as catalyst employed, activity of the catalyst, character of the feed gases, and the temperatures utilized. Pressures in the range from about 1 to about 100 and higher atmospheres have been suggested. The character of the feed gases introduced into the synthesis reaction zone depends somewhat on the particular temperatures and pressures, and upon the catalyst employed. For example, when employing cobalt type catalysts, it is preferred to use about 1 mol of carbon monoxide to about 2 mols of hydrogen, while when an iron catalyst is utilized, equal mols of hydrogen and carbon monoxide or 1 mol of carbon monoxide to about 2 mols of hydrogen in the feed synthesis gases may be used.

The synthesis gases comprising hydrogen and carbon monoxide are produced by various procedures. Methane or natural gas may be oxidized with a reducible metal oxide, with pure oxygen, or with gases comprising oxygen. Other feed stocks may comprise coal, shale, and other hydrocarbons. The reaction may be conducted in a single stage or in a plurality of stages. For example, one procedure is to employ a two-stage reforming process using steam, methane and carbone dioxide for the production of carbon monoxide and hydrogen. When employing methane as feed gas and oxidizing the same with a reducible metal oxide, the reactions are generally conducted at temperatures in the range from about 1400° F. to about 2000° F. When the synthesis gases are produced, by utilizing oxygen and natural gas the temperatures in the reaction zone are usually in the range from about 2000 to about 3000° F.

It has heretofore been known in the art to contact gases and solids by passing the gases upwardly through an enlarged treating zone, containing a body of finely-divided solids to be contacted, at a controlled velocity to maintain the solids in the treating zone in quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In these fluidized reactions the small subdivided solids or catalysts usually have a particle size in the range from about 1 to 200 microns and higher. These particles are suspended in a fluid ebullient state by means of the upflowing suspending gases, the velocity of which varies in the general range from about 0.1 to 5 feet per second.

In hydrocarbon synthesis reactions one difficulty encountered is carbon deposition on the catalyst. This is particularly serious in a fluidized process. One result of carbon formation is that the catalyst fragmentates which results in poor fluidity and poor heat transfer within the synthesis zone. Temperature control and control of the entire synthesis reaction is thus lost. Various proposals have been suggested in order to overcome or at least reduce the adverse effects resulting from fragmentation of the catalyst. One proposal has been to use an inert diluent in the synthesis zone in order to maintain fluidity of the catalyst. If this is done the heat transfer rate is maintained at a relatively high level due to the fact that the fluidity of the solid bed is also maintained at a desirable level. Temperature control and control of the synthesis reaction is thus maintained.

However, one disadvantage incurred in the use of sand is that certain materials appear to be associated with sand which have an adverse effect on the selectivity of the actual catalyst. I have, however, now discovered, that providing the sand is pretreated before use with acid, as for example, hydrochloric, sulfuric, nitric or similar acid, marked improvements are secured.

The process of my invention may be more readily understood by the following example illustrating one embodiment of the same.

Example

Three operations A, B, and C were conducted. Operation A was conducted for a time period so that the percentage of carbon by weight on the catalyst was about 36%. The catalyst had fragmented as measured from a decrease in bulk density from 2.4 g./cc. to 0.8 g./cc. At this point it was relatively difficult to maintain fluidity of the catalyst, although selectivity and activity remained at a high level.

A portion of the used catalyst of operation A was mixed with one-third volume of untreated silica sand and the operation continued as operation B.

A portion of fresh catalyst similar to that used in operation A was mixed with an equal volume of treated silica sand and the operation continued as operation C. The sand used in operation C had been digested with a three normal solution of hydrochloric acid, washed free of acid and dried. This treatment reduced the iron content of the sand from 1.66% to 0.81% and removed acid soluble surface impurities.

The results of the respective operations are as follows:

Operation

| | A | B | C |
|---|---|---|---|
| Temp. °F. | 650 | 650 | 650 |
| Pressure (Gage) lbs./sq. in. | 400 | 400 | 400 |
| Hydrogen to CO Ratio | 2 to 1 | 2 to 1 | 2 to 1 |
| $CO_2$ percent | 8 | 8 | 8 |
| Yield $^1$/m.$^3$ $H_2$+CO Consumed | 183 | 117 | 182 |

$^1$ Cc. of hydrocarbons having four and more carbon atoms per molecule.

From the above it is apparent I secure unexpected results by operating in accordance with my process.

My invention is applicable when employing any type of sand, particularly when employing silica sand. Although I prefer to use hydrochloric acid, other acids, as for example, acids of sulfur, such as sulfuric acid, and nitric acid are satisfactory. In general I prefer that the concentration of the acids be in the range from about 3 to 12 normal.

The process of my invention is not to be limited by any theory as to mode of operation, but only in and by the following claims in which it is desired to claim all novelty insofar as the prior art permits.

I claim:

1. In a hydrocarbon synthesis process wherein carbon monoxide and hydrogen react in a synthesis zone in the presence of an iron type catalyst to form hydrocarbon constituents containing more than one carbon atom in the molecule and wherein said iron catalyst disintegrates due to carbon formation resulting in loss of catalyst fluidity, the improvement which comprises using with said fluidized catalyst an inert fluidizable solid siliceous diluent which has previously been treated with an acid.

2. Process as defined by claim 1 wherein said fluidizable, solid siliceous diluent comprises sand.

3. Process as defined by claim 1 wherein said fluidizable, solid siliceous diluent comprises sand which has been previously treated with a 3 to 12 normal hydrochloric acid solution.

SIMPSON D. SUMERFORD.

REFERENCES CITED

The following references are of record in the file of this patent:

UNITED STATES PATENTS

| Number | Name | Date |
|---|---|---|
| 2,035,606 | Jaeger | Mar. 31, 1936 |
| 2,287,891 | Linckh | June 30, 1942 |
| 2,360,787 | Murphree | Oct. 17, 1944 |
| 2,393,240 | Dreyfus | Jan. 22, 1946 |
| 2,393,636 | Johnson | Jan. 29, 1946 |
| 2,398,462 | Roelen | Apr. 16, 1946 |